United States Patent
Wang (10) Patent No.: US 12,001,381 B2
(45) Date of Patent: Jun. 4, 2024

(54) RECONFIGURABLE PROCESSOR AND RECONFIGURABLE PROCESSOR SYSTEM

(71) Applicant: MORNINGCORE TECHNOLOGY CO., CHINA, Shanghai (CN)

(72) Inventor: Weibing Wang, Shanghai (CN)

(73) Assignee: MORNINGCORE TECHNOLOGY CO., CHINA (CN)

( * ) Notice: Subject to any disclaimer, the term of this patent is extended or adjusted under 35 U.S.C. 154(b) by 231 days.

(21) Appl. No.: 17/769,703

(22) PCT Filed: Jun. 17, 2020

(86) PCT No.: PCT/CN2020/096541
§ 371 (c)(1),
(2) Date: Apr. 15, 2022

(87) PCT Pub. No.: WO2021/073137
PCT Pub. Date: Apr. 22, 2021

(65) Prior Publication Data
US 2022/0391274 A1 Dec. 8, 2022

(30) Foreign Application Priority Data
Oct. 17, 2019 (CN) .......................... 201910990217.4

(51) Int. Cl.
*G06F 15/78* (2006.01)
*G06F 15/163* (2006.01)

(52) U.S. Cl.
CPC ........ *G06F 15/7867* (2013.01); *G06F 15/163* (2013.01)

(58) Field of Classification Search
None
See application file for complete search history.

(56) References Cited

U.S. PATENT DOCUMENTS 6,961,781 B1 * 11/2005 Mukherjee .............. H04L 47/50
709/240
8,738,860 B1 * 5/2014 Griffin ................ G06F 12/0897
711/122

(Continued)

FOREIGN PATENT DOCUMENTS

CN  101782893 A  7/2010
CN  102053947 A  5/2011

(Continued)

OTHER PUBLICATIONS

International Search Report in International Application No. PCT/CN2020/096541, dated Sep. 22, 2020.

*Primary Examiner* — Jany Richardson
(74) *Attorney, Agent, or Firm* — Kim IP Law Group LLC (57) ABSTRACT

Provided are a reconfigurable processor and a reconfigurable processor system, where the reconfigurable processor includes: a hardware message management module (110), a memory management system (120) and an arithmetic and logic unit (130). The memory management system (120) is connected to the hardware message management module (110) and the arithmetic and logic unit (130) respectively; the hardware message management module (110) is configured to read and parse at least one hardware message, to configure a priority of each of the at least one hardware message and store each of the at least one hardware message into a memory through the memory management system (120); and the arithmetic and logic unit (130) is configured to run the at least one hardware message according to the configured priority.

10 Claims, 7 Drawing Sheets

(56) References Cited

U.S. PATENT DOCUMENTS

| | | | |
|---|---|---|---|
| 2004/0010612 A1* | 1/2004 | Pandya | ............... H04L 9/40 709/213 |
| 2004/0148415 A1 | 7/2004 | Sikdar | |
| 2019/0196573 A1* | 6/2019 | Gupta | ............. G06F 1/3203 |

FOREIGN PATENT DOCUMENTS

| | | | |
|---|---|---|---|
| CN | 102073481 | A | 5/2011 |
| CN | 104243781 | A | 12/2014 |
| CN | 104615488 | A | 5/2015 |
| CN | 105630735 | A | 1/2016 |
| CN | 105468568 | A | 4/2016 |
| CN | 105867994 | A | 8/2016 |
| CN | 106569968 | A | 4/2017 |
| CN | 109144702 | A | 1/2019 |
| CN | 109902043 | A | 6/2019 |
| CN | 110321162 | A | 10/2019 |
| CN | 110737628 | A | 1/2020 |

* cited by examiner

RECONFIGURABLE PROCESSOR AND RECONFIGURABLE PROCESSOR SYSTEM

CROSS-REFERENCE TO RELATED APPLICATIONS

This is a national stage application filed under 37 U.S.C. 371 based on International Patent Application No. PCT/CN2020/096541, filed Jun. 17, 2020, which claims priority to Chinese Patent Application No. 201910990217.4 filed with the China Patent Office on Oct. 17, 2019, the disclosures of which are incorporated herein by reference in their entireties.

FIELD

Embodiments of the present disclosure relate to the field of embedded reconfigurable technologies, for example, to a reconfigurable processor and a reconfigurable processor system.

BACKGROUND

Information processing equipment contains a large number of specialized arithmetic units, these arithmetic units are used to perform a variety of different algorithm processing tasks. These arithmetic units can be roughly divided into signal processors based on general-purpose processing architectures and application specific integrated circuits (ASICs) customized for specific algorithms depending on whether their functions can be flexibly changed through software. With the in-depth research on general-purpose processor architectures, the improvement of energy efficiency, and the increase in evolution demand and in complexity of algorithm, signal processors based on general-purpose processing architectures have attracted more and more attention.

The signal processors based on the general processing architectures are roughly divided depending on the technical route into the scheme based on the conventional central processing unit (CPU), the scheme based on the conventional graphics processor unit (GPU), the scheme based on the conventional digital signal processor (DSP), the scheme based on reconfigurable arithmetic and the scheme based on field-specific processor, etc. Although these schemes have their own advantages and application scenarios, for embedded terminals, when performing communication signal processing, image and voice signal processing and artificial intelligence (AI) reasoning, the main indexes of performance, power, area (PPA) of the scheme based on the conventional CPU, the scheme based on the conventional GPU and the scheme based on the conventional DSP are far behind those of ASIC. However, the ASIC scheme has the disadvantage of not being able to flexibly modify the evolution algorithm.

The schemes based on reconfigurable arithmetic and the schemes based on field-specific processor are most studied schemes in the current embedded terminals, of both of which the flexibility and PPA indexes have reached a good balance compared with those of the ASIC. The scheme based on field-specific processor provides a specific processor for each type of application. Specific processors are different in hardware-supported data types, special instructions, pipeline lengths, and include different minimum sets of instructions, which makes multiple specific processors irreplaceable with each other, resulting in new issues that designs are "fragmented" and arithmetic power cannot be expanded easily.

The scheme based on the reconfigurable arithmetic adopts a unified hardware architecture and configuration instructions, adopts a combination of data flow driving and instruction flow driving, which can not only obtain good PPA performance, but also maintain sufficient flexibility. However, the schemes based on reconfigurable arithmetic in the related art fail to meet the requirements in power consumption and processing performance yet.

SUMMARY

A reconfigurable processor and a reconfigurable processor system are provided according to embodiments of the present disclosure, which can address the technical problems of low processing performance and high energy consumption in the related art.

In a first aspect, a reconfigurable processor is provided according to embodiments of the present disclosure, which includes: a hardware message management module, a memory management system and an arithmetic and logic unit. The memory management system is connected to the hardware message management module and the arithmetic and logic unit respectively.

The hardware message management module is configured to read and parse at least one hardware message, configure a priority for each of the at least one hardware message, and store each of the at least one hardware message in a memory through the memory management system.

The arithmetic and logic unit is configured to run the at least one hardware message according to the configured priority.

In one implementation, the memory management system includes a GDMA subunit, a channel arbitrator and a data flow management subunit, and is configured to perform data transmission.

In a second aspect, a reconfigurable processor system is further provided according to embodiments of the present disclosure, which includes at least two cascaded reconfigurable processors as described above.

DETAILED DESCRIPTION

The present disclosure is described hereinafter with reference to the drawings and embodiments. It may be understood that the embodiments described herein are merely intended to explain the present disclosure, rather than limiting the present disclosure. It should be further noted that the drawings only show part of rather than all of structures related to the present disclosure for the convenience of description.

First Embodiment

Figure 1:
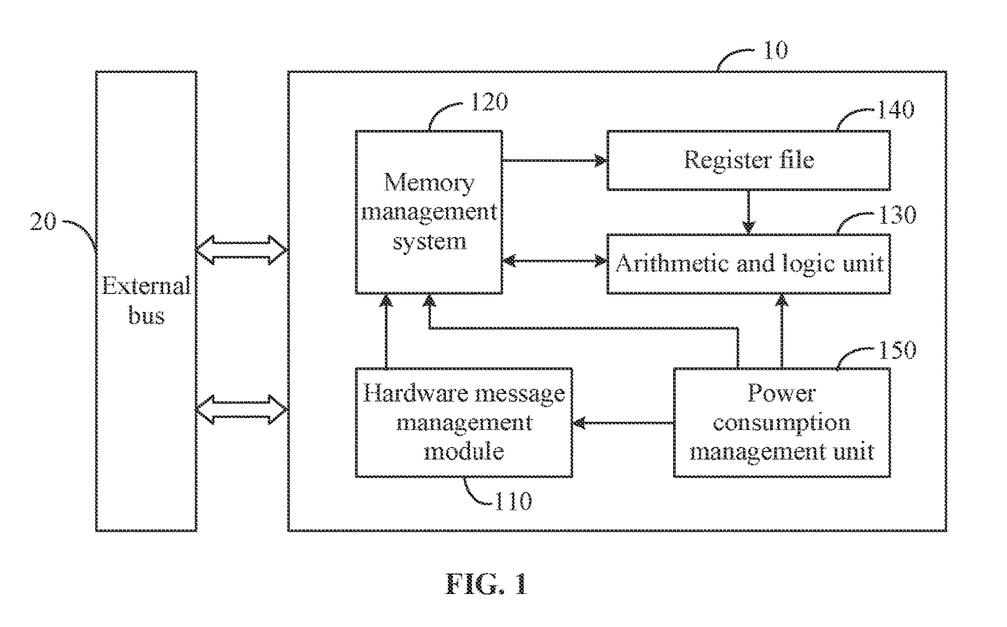
FIG. 1 is a schematic structure diagram of a reconfigurable processor according to a first embodiment of the present disclosure.

FIG. 1 is a schematic structural diagram of a reconfigurable processor according to the present embodiments of the present disclosure. As shown in FIG. 1, the reconfigurable processor 10 includes a hardware message management module 110, a memory management system 120 and an arithmetic and logic unit 130. The memory management system 120 is connected to the hardware message management module 110 and the arithmetic and logic unit 130 respectively.

In an embodiment, the hardware message management module 110 is configured to read and parse at least one hardware message, configure a priority of each of the at least one hardware message, and store each of the at least one hardware message in a memory through the memory management system 120. The arithmetic and logic unit 130 is configured to run the at least one hardware message according to the configured priority.

In an embodiment, the memory includes internal registers of the reconfigurable processor and an external memory of the reconfigurable processor. The hardware message management module 110 is configured to store the at least one hardware message in the memory through the memory management system by: storing the hardware message in the registers through the memory management system. The hardware message management module 110 is further configured to send a memory access request to the memory management system 120 according to the priority of the at least one hardware message. The memory management system 120 is configured to receive the memory access request, read a hardware message with the highest priority among hardware messages that have not been ran in the at least one hardware message from the external memory, process the read hardware message, and send the processed hardware message to the arithmetic and logic unit 130. The arithmetic and logic unit 130 is configured to receive the processed hardware message and run the processed hardware message.

In an embodiment, the memory management system 120 is configured to read a hardware message with the highest priority among hardware messages that have not been ran in the at least one hardware message from the external memory, process the read hardware message, and send the processed hardware message to the arithmetic and logic unit 130 by: reading configuration flow information and data flow information of the hardware message with the highest priority from the external memory, processing the configuration flow information and the data flow information, and sending the processed configuration flow information and the processed data flow information to the arithmetic and logic unit 130. The arithmetic and logic unit 130 is configured to receive the processed configuration flow information and the processed data flow information and run the processed configuration flow information and the processed data flow information. The configuration flow information is used to instruct the arithmetic and logical operation unit 130 to reconfigure and generate a computation mode required to run the hardware message, and the data flow information refers to the operation data required by the arithmetic and logical operation unit 130 to perform a logical operation corresponding to the computation mode.

As an example, after reading and parsing the at least one hardware message, the hardware message management module 110 may determine the priority of each hardware message and memory address information of configuration flow information and memory address information of data flow information of each hardware message according to a parsing result, and send a memory access request to the memory management system 120 according to the priority of the at least one hardware message. The memory access request includes memory address information of configuration flow information and memory address information of data flow information of the hardware message with the highest priority in the at least one hardware message, to enable the memory management system 120, after receiving the memory access request, to read the configuration flow information and the data flow information of the hardware message with the highest priority from the external memory according to the memory address information of the configuration flow information and the memory address information of the data flow information of the hardware message with the highest priority in the memory access request.

In an embodiment, the hardware message management module 110, after determining that the running of one hardware message finishes, sends a memory access request to the memory management system 120 to cause a next hardware message to be ran.

In an embodiment, the arithmetic and logic unit 130 is configured to run the processed configuration flow information and the processed data flow information by: reconfiguring to generate a computation mode corresponding to the configuration flow information, performing a logic operation corresponding to the computation mode according to the computation mode and the data flow information, to run the hardware message. The number of the computation mode is at least one.

The reconfigurable processor 10 according to the present embodiments, also referred to as a general arithmetic unit (GAU), is a processor performing many different algorithmic processing tasks by reconfiguring reconfigurable granularity, basic arithmetic units and arithmetic unit topological relationships, and etc. An external interface is further provided in the reconfigurable processor 10, and is configured to be used for accessing to the external memory.

Figure 2:
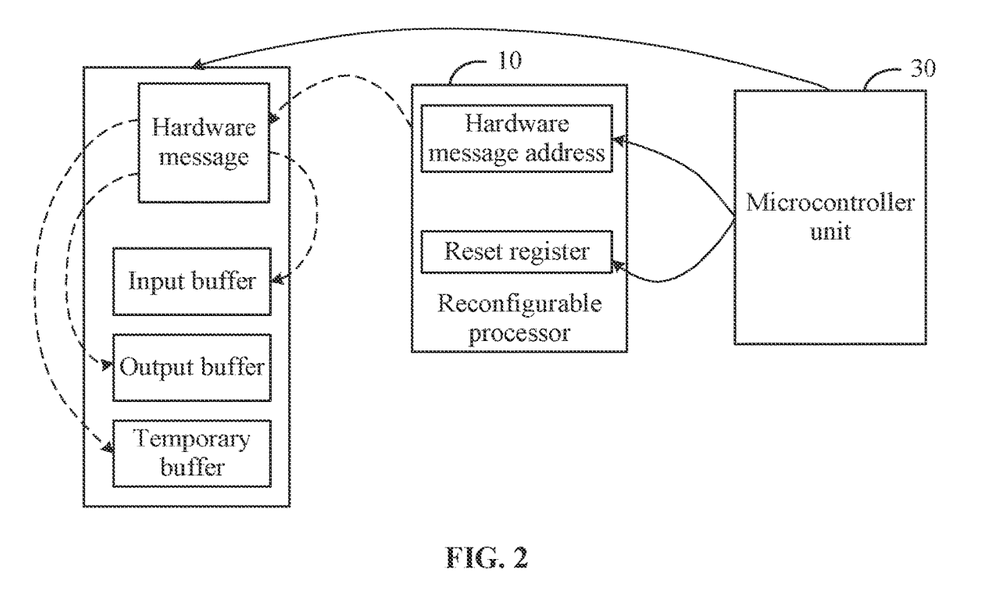
FIG. 2 is a schematic diagram of configuration of a reconfigurable processor according to the first embodiment of the present disclosure.

The reconfigurable processor 10 in the present embodiments adopts a hardware message-driven mechanism. The reconfigurable processor 10 needs to be configured before it works. Referring to FIG. 2, FIG. 2 is a schematic diagram of configuration of a reconfigurable processor according to the first embodiment of the present disclosure. The configuration process can be as follows. A microcontroller unit (MCU) 30 configures a reset register in the reconfigurable processor 10, to reset the reconfigurable processor 10; the microcontroller unit 30 initializes the hardware message, and configures an address of the hardware message, assigns a value to a corresponding register; and the microcontroller unit 30 de-resets the reconfigurable processor 10. In an embodiment, the hardware message may include configuration flow information and data space information required by the reconfigurable processor 10, and an address of the hardware message in the memory of the reconfigurable processor 10 is configured by the register in the reconfigurable processor 10. The reconfigurable processor 10 is in a reset (RESET) state normally, and starts to work immediately after the reset state is released.

In an embodiment, the hardware message may include data space information, and the data space information may include an address of configuration flow information of the hardware message in the external memory and an address of data flow information of the hardware message in the external memory.

Figure 3:
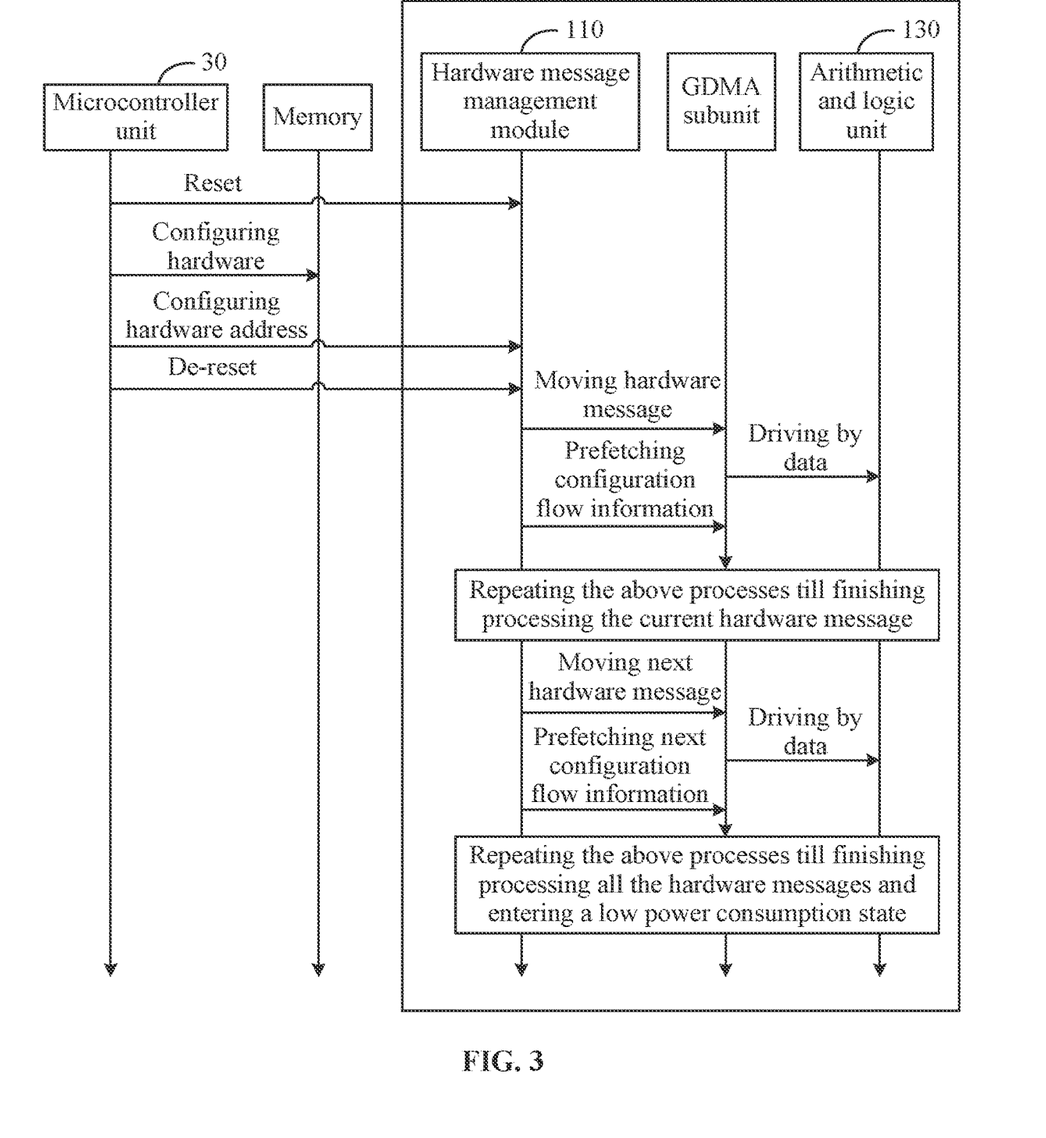
FIG. 3 is a schematic diagram of operation of a reconfigurable processor according to the first embodiment of the present disclosure.

In an embodiment, the workflow of the reconfigurable processor 10 is as shown in FIG. 3. FIG. 3 is a schematic diagram of operation of a reconfigurable processor according to the first embodiment of the present disclosure. The workflow in FIG. 3 includes a configuration flow before working of the reconfigurable processor in addition to the workflow of the reconfigurable processor. The configuration flow is as follows: the microcontroller unit 30 resets the reconfigurable processor 10 and configures the reset register of the reconfigurable processor 10; the microcontroller unit 30 performs initialization of a corresponding hardware message before triggering the reconfigurable processor 10 to work; the microcontroller unit 30 configures an address of the hardware message, that is, configures a start address register; the microcontroller unit 30 de-resets the reconfigurable processor 10, core modules of the reconfigurable processor 10 are powered on and the clock is restored; the hardware message management module 110 controls a dedicated channel to copy the hardware messages into the reconfigurable processor 10.

The workflow is as follows. The hardware message management module 110 configures a GDMA subunit in the memory management system 120 according to the data space information in the currently activated hardware message to trigger the dedicated channel to move a first piece of configuration flow information in a corresponding memory of the reconfigurable processor 10. The reconfigurable processor 10 starts to work, and drives the arithmetic and logic unit 130 to run the hardware message by data, until the processing of the current hardware message is terminated; the hardware message management module 110 prefetches a next piece of configuration flow information to the inside of the reconfigurable processor 10, continues to repeat the above working process until the reconfigurable processor 10 finishes running all configurations and finishes running all hardware messages; the reconfigurable processor 10, after finishing all tasks, is automatically powered off, and the clock goes into a low power consumption state.

In an embodiment, an operation flow of the reconfigurable processor for data flow information is the same as the operation flow for configuration flow information in the above-described workflow.

In an embodiment, the reconfigurable processor runs the operation flow for configuration flow information and the operation flow for data flow information in parallel on the configuration flow information and the data flow information.

In an embodiment, the hardware message management (HMM) module 110 may read, for example through a set channel, a hardware message transmitted through an external bus 20, and the hardware messages may include configuration flow information and data space information required by the reconfigurable processor 10. A hardware message management rule in the present embodiments is executed by the hardware message management module 110. For example, the hardware message management rule includes: once a hardware message is ran, it is not allowed to be interrupted; a hardware message can be triggered by an interruption to be ran, or hardware messages are ran sequentially according to serial numbers of the hardware messages; hardware messages are ran according to their priorities; each external interruption triggers one hardware message; whenever, only one hardware message is in a ready (Ready) state, and only one hardware message is in a run (Run) state.

Figure 4:
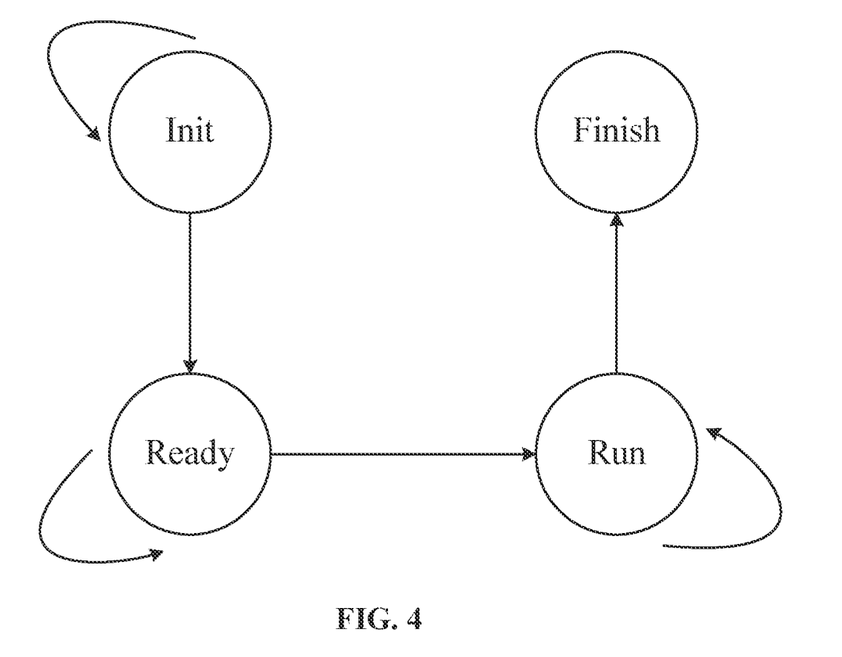
FIG. 4 is a schematic diagram of states of a hardware message according to the first embodiment of the present disclosure.

FIG. 4 is a schematic diagram showing states of a hardware message according to the first embodiment of the present disclosure. The states of the hardware message in FIG. 4 may include an initialization (Init) state, a ready (Ready) state, a run (Run) state, and a finish (Finish) state. In the initialization state, a legal hardware message is configured by an external CPU, and when an external interruption signal arrives or the running of a previous hardware message finishes, a current hardware message is triggered to be in the ready state; if the running of the previous hardware message has finished, the current hardware message is transferred from the ready state to the run state; and if the running of the previous hardware message has not finished, the current hardware message is always in the ready state, waiting for the running of the previous message to finish; after that, the configuration flow information indicated by the current hardware message is ran in the run state, until the running of all the hardware messages finishes, it is then transferred to the finish state; relevant flag bits in the hardware message buffer pool are cleared, if the operation automatically stops the running of the current hardware message, the flag bit of the current hardware message will be set as an invalid flag.

In an embodiment, the arithmetic and logic unit (ALU) 130 is configured to generate a computation mode through reconfiguration, and the number of the computation mode is at least one. The arithmetic and logic unit 130 includes at least one basic arithmetic unit of a multiplier, an adder, a comparator, and etc., and can perform reconfiguration of many different computation modes.

In an embodiment, a computation mode reconfigured by the arithmetic and logic unit 130 may include a variety of common basic operators for signal processing, for example, it may include operations such as convolution, correlation, vector scale (Scale) operation, vector dot product, and vector multiplication, matrix multiplication, interpolation/decimation, butterfly operation, polynomial operation, lookup table, accumulation, comparison, sin, cos, division, and reciprocal of square root. For example, an operator formula corresponding to the convolution operation is $$y(n) = h(n) * x(n) = \sum_{k=0}^{K-1} h(k)x(n-k),$$

where h(n) and x(n) represent two discrete sequences, and y(n) is a sequence obtained by performing convolution operation on the sequence h(n) and the sequence x(n), where n, k and K are integers. A finite impulse response (FIR) filter is a common filter that performs convolution operations. The filter coefficients of the FIR filter are normally symmetric. Under the condition that the number of the multipliers is certain, in order to support higher-order FIR filters, some special structures are generally used. For example, when K is an even number, a corresponding operator formula is:

$$y(n) = \sum_{k=0}^{K/2-1} h(k)[x(n-k) + x(n-K+1+k)],$$

and when K is an odd number, a corresponding operator formula is:

$$y(n) = \sum_{k=0}^{(K-1)/2-1} h(k)[x(n-k) + x(n-K+1+k)] + h((K-1)/2)x(n-(K-1)/2).$$

Figure 5:
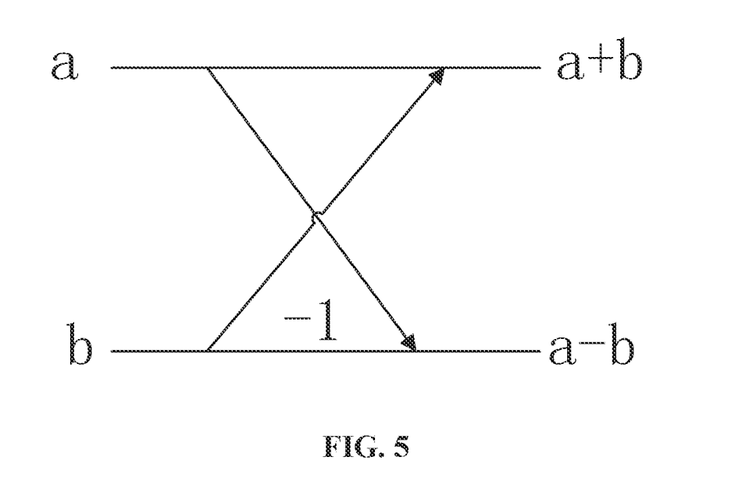
FIG. 5 is a schematic diagram of a butterfly operation factor according to the first embodiment of the present disclosure.
Figure 6:
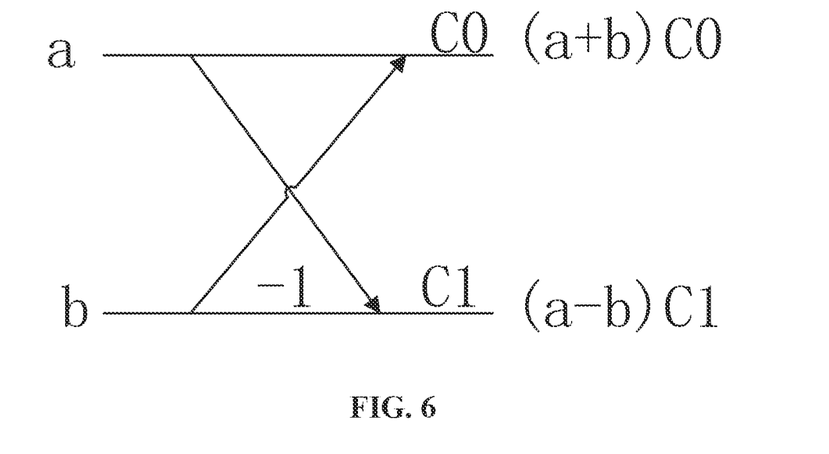
FIG. 6 is a schematic diagram of another butterfly operation factor according to the first embodiment of the present disclosure.

An operator formula corresponding to the correlation operation is:

$$r(k) = s(k) * x(k) = \sum_{n=0}^{N-1} s(n)x(n+k),$$

where, s (k) and x(k) represent two discrete sequences, r(k) is a sequence obtained by performing correlation operation on the sequence s(k) and the sequence x(k), and n, k and N are integers. An operator formula corresponding to the vector Scale operation is ka=[ka(0) . . . ka(N−1)], where the vector a=[a(0) . . . a(N−1)], and k is a scalar. An operator formula corresponding to the vector dot product operation is ab=c=[a(0)b(0) . . . a(N−1)b(N−1)], where the vector a=[a(0) . . . a (N−1)], the vector b=[b(0) . . . b(N−1)], c is a vector obtained by performing dot product operation on the vector a and the vector b. The operator formula corresponding to the vector multiplication operation is ab=a(0)b(0)+ . . . +a(N−1)b(N−1), where the vector a=[a(0) . . . a(N−1)], the vector b=[b(0) . . . b(N−1)]. In the matrix multiplication operation, the operations for matrixes 2×2, 4×4 are optimized, which can reduce the amount of access to the external memory. Taking the operation for matrix 2×2 as an example, the corresponding operator formula is $$\begin{bmatrix} a_{00} & a_{01} \\ a_{10} & a_{11} \end{bmatrix} \begin{bmatrix} b_{00} & b_{01} \\ b_{10} & b_{11} \end{bmatrix} = \begin{bmatrix} a_{00}b_{00} + a_{01}b_{10} & a_{00}b_{01} + a_{01}b_{11} \\ a_{10}b_{00} + a_{11}b_{10} & a_{10}b_{01} + a_{11}b_{11} \end{bmatrix},$$

regarding whether it is required to support matrix multiplication, it can be set according to practical situations. Regarding interpolation/decimation, the interpolation operation is generally to insert N zeros between elements in a sequence, and the decimation operation is generally to extract the required value from a sequence according to a certain pattern. A butterfly operation factor is as shown in FIG. 5, FIG. 5 is a schematic diagram of a butterfly operation factor according to the first embodiment of the present disclosure. Generally, two vectors a=[a(0) . . . a(N−1)] and b=[b(0) . . . b(N−1)] are input, an output result after being processed with the butterfly factor is two new vectors [a(0)+b(0) . . . a(N−1)+b(N−1)] and [a (0)−b(0) . . . a(N−1)−b (N−1)]. An enhanced form of the butterfly operation is to output and normalize two multiplication coefficients, as shown in FIG. 6. FIG. 6 is a schematic diagram of another butterfly operation factor according to the first embodiment of the present disclosure. An operator formula corresponding to a polynomial operation is $y=a_{K-1}x^{K-1}+a_{K-2}x^{K-2}+ \ldots a_0$. Operations using look-up tables mainly has the following two situations: looking up a corresponding element from a table according to an index and outputting an index corresponding to a non-zero element in a vector. An operator formula corresponding to accumulation is $$y = \sum_{n=0}^{N-1} a(n).$$

In the comparison, elements of a vector a and corresponding elements of a vector b are compared, and the following two result outputs are considered to meet different application scenarios $$y(k) = \begin{cases} \text{CONST\_1} & a(k) > b(k) \\ \text{CONST\_2} & \text{else} \end{cases}.$$

Other common arithmetic operations, such as sin, cos, division and reciprocal of square root, can also be directly obtained by reconfiguration without adding special arithmetic logics.

As an example, in the computation mode of butterfly operation, the arithmetic and logic unit 130 can send two input data flows FIFO0 and FIFO1 to multiple input registers respectively through a multiplexer (MUX), and send outputs of the multiple input registers to corresponding adders through an MUX, and results of the adders are finally sent to output registers through an MUX, and the data in the output registers is finally written to the memory by outputting output first input first output (FIFO).

Figure 7:
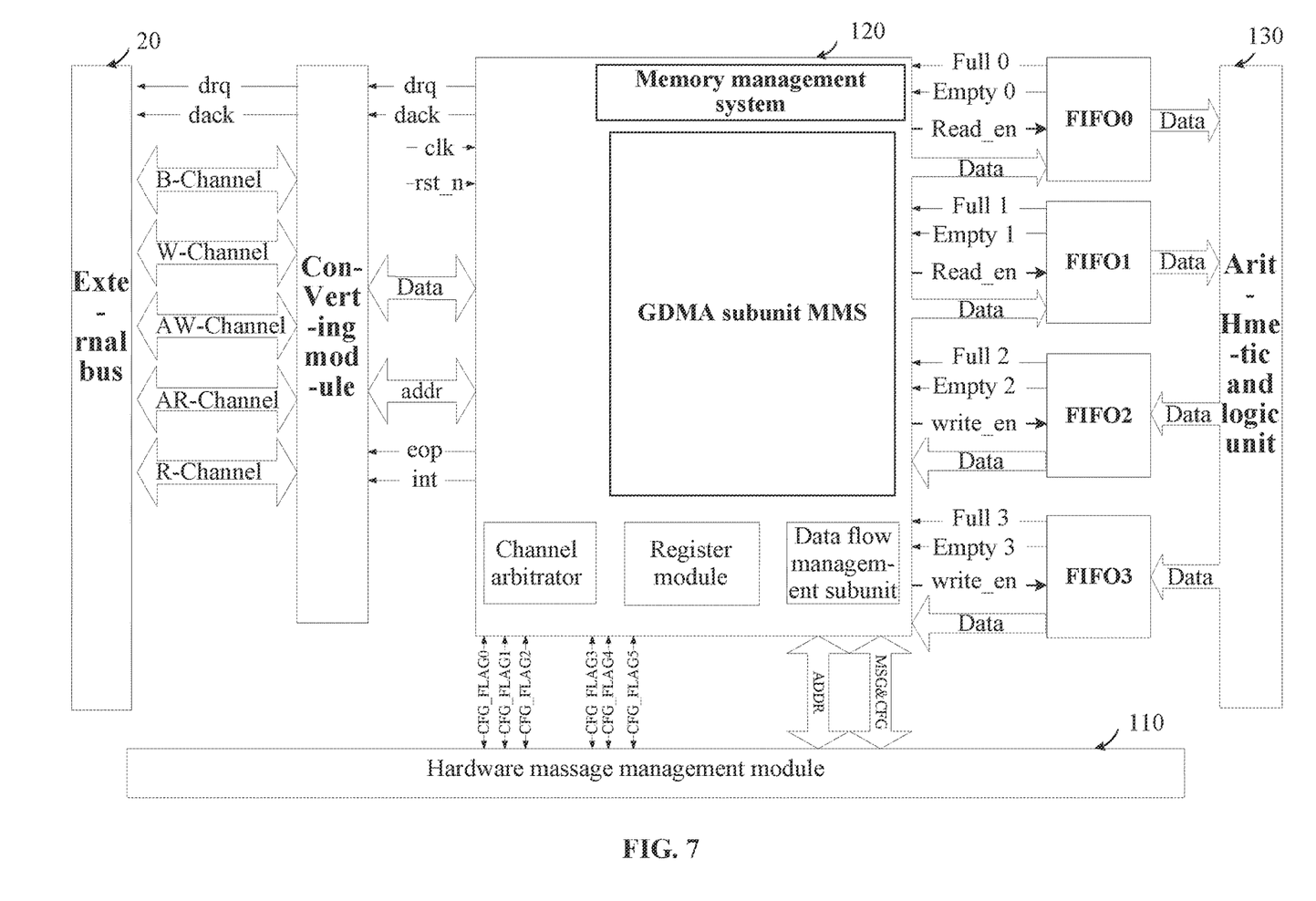
FIG. 7 is a schematic structure diagram of a memory management system according to the first embodiment of the present disclosure.

The memory management system (MMS) 120 in the present embodiments may include a general direct memory access (GDMA) subunit, a channel arbitrator and a data flow management subunit, and is configured to perform data transmission. The GDMA subunit is configured to perform input and output data flow operations in terms of computation modes, the channel arbitrator is configured to manage memory access conflicts and priorities, and the data flow management subunit is configured to implement data flow driving. Referring to FIG. 7, FIG. 7 is a schematic structure diagram of a memory management system according to the first embodiment of the present disclosure. In addition to the memory management system 120, FIG. 7 also includes connection and access relationships between the memory management system 120 and either the hardware message management module 110 or the arithmetic and logic unit 130 in the reconfigurable processor 10, and also includes connection and access relationship between the memory management system 120 the external bus 20. The memory management system 120 is configured to manage input data and output data, and implement data flow driving. The external bus 20 in FIG. 7 may be an advanced extensible interface (AXI) bus, which is only taken as an example, and other buses are also applicable.

In an embodiment, the number of the data flow management subunits is at least one, and the GDMA subunit is connected to the channel arbitrator, the at least one data flow management subunit and the hardware message management module 110 respectively. The at least one data flow management subunit is connected to the channel arbitrator and the arithmetic and logic unit 130 respectively. The GDMA subunit is configured to, in the case of receiving a memory access request sent by the hardware message management module 110, read configuration flow information and data flow information of a hardware message with the highest priority among the hardware messages that have not been ran in the at least one hardware message from the external memory. The GDMA subunit is also configured to, in the case of receiving at least one data access request forwarded by the channel arbitrator, send the configuration flow information and the data flow information to the data flow management subunit which sent the at least one data access request. The data flow management subunit is configured to send a data access request for accessing the GDMA subunit to the channel arbitrator, receive configuration flow information and data flow information sent by the GDMA subunit, convert the configuration flow information and the data flow information into a data format required by the arithmetic and logic unit, and output the converted configuration flow information and the converted data flow information to the arithmetic and logic unit 130. The channel arbitrator is configured to, in the case of receiving data access requests sent by multiple data flow management subunits, arbitrates the multiple data flow management subunits according to a set arbitration rule to determine an access sequence of the multiple data flow management subunits to the GDMA subunits and forward the data access requests sent by the multiple data flow management subunits to the GDMA subunits sequentially according to the access sequence.

In an embodiment, the data flow management subunit monitors the process of the GDMA subunit reading configuration flow information and data flow information from the external memory, and when the GDMA subunit finishes the read operation, the data flow management subunit sends a data access request for accessing the GDMA subunit to the channel arbitrator.

The memory management system 120 has the following characteristics. The memory management system 120 can support data transmission with an external bus with variable bit width; the memory management system 120 can support multiple GDMA subunit working in parallel through time-division multiplexing in a channel; each transmission channel of the memory management unit 120 can support transmission priority setting; an operation mode of triggering by data flow can be realized through the memory management system 120 monitoring off-chip data; the memory management system 120 can support management the input and output FIFO connected to the memory management system 120; the memory management system 120 can support data transmission between a tightly coupled memory (TCM) of fixed size set on chip and the input and output FIFO connected to the memory management system 120; and the memory management system 120 can support burst sizes of multiple channels being configurable after the channel arbitrator responses to requests from channels.

As shown in FIG. 1, the reconfigurable processor 10 in the present embodiments further includes a register file (RF) 140, and the register file 140 is connected to the memory management system 120 and the arithmetic and logic unit 130 respectively. In an embodiment, the register file 140 is configured to configure addresses, in the memory, of the hardware messages transmitted by the memory management system 120 and provide the arithmetic and logic unit 130 with registers required for arithmetic.

In an embodiment, the reconfigurable processor 10 in the present embodiments further includes a power consumption management unit 150, and the power consumption management unit 150 is connected to the hardware message management module 110, the memory management system 120, and the arithmetic and logic unit 130 respectively, and is configured to perform power consumption management. As an example, an energy efficiency ratio of the reconfigurable processor 10 according to the present embodiments can reach 0.743 Tera Operations Per Second/Watt (TOPS/W), which is much more excellent than 277 Giga Operations Per Second/Watt (GOPS/W) in the related art.

The reconfigurable processor according to the present embodiments can have multiple external hardware messages read and parsed and have their priorities configured by the hardware message management module, and then have the hardware messages run according to the priorities, so that the processing performance of the reconfigurable processor is improved, and the power consumption is reduced. Further, the memory management system reconfigures the computation modes based on the basic arithmetic units, and adopts the data flow driving method, which, compared with related art, reduces the configuration overhead on the basis of meeting the requirements of various signal processing scenarios.

Second Embodiment

A reconfigurable processor system is further provided according to embodiments of the present disclosure, which includes at least two cascaded reconfigurable processors 10 as described in the first embodiment. In an embodiment, the at least two reconfigurable processors 10 may access data through a preset read channel and a preset write channel.

Figure 8:
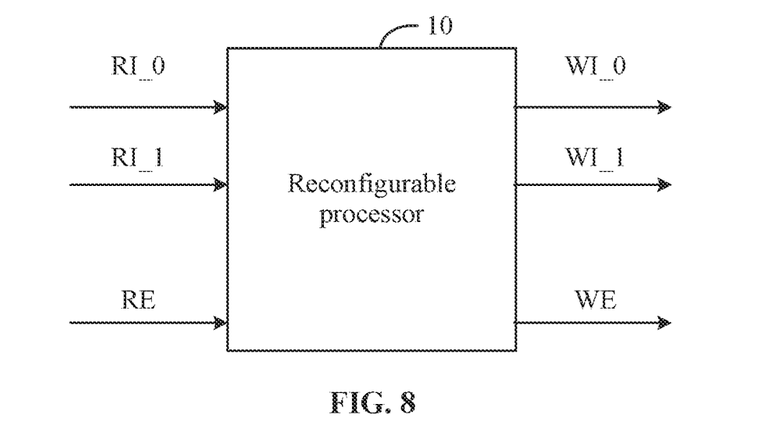
FIG. 8 is a schematic diagram of channels of a reconfigurable processor according to a second embodiment of the present disclosure.

FIG. 8 is a schematic diagram of a channel of a reconfigurable processor according to the second embodiment of the present disclosure. The data access channels (i.e., ports) of the reconfigurable processor 10 can be abstracted as shown in FIG. 8, where RI_0 and RI_1 are data read access ports for internal interconnection, WI_0 and WI_1 are data write access ports for internal interconnection, RE is a data read port for the reconfigurable processor 10 to access external memory, and WE is a data write port for the reconfigurable processor 10 to access external memory.

Figure 9:
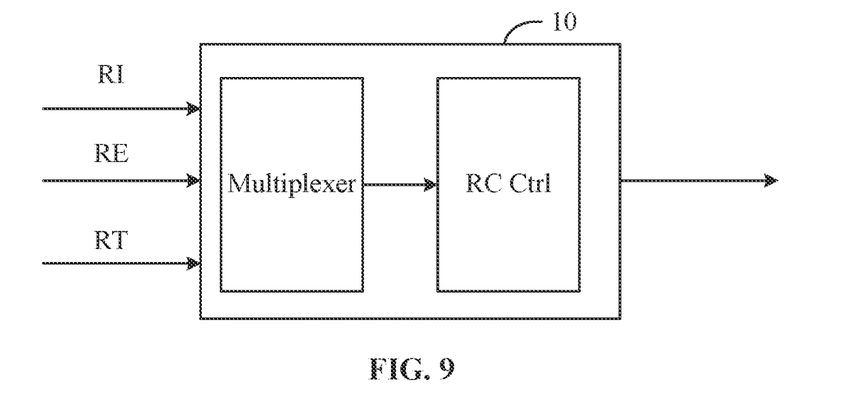
FIG. 9 is a schematic diagram of read channels of a reconfigurable processor according to the second embodiment of the present disclosure.
Figure 10:
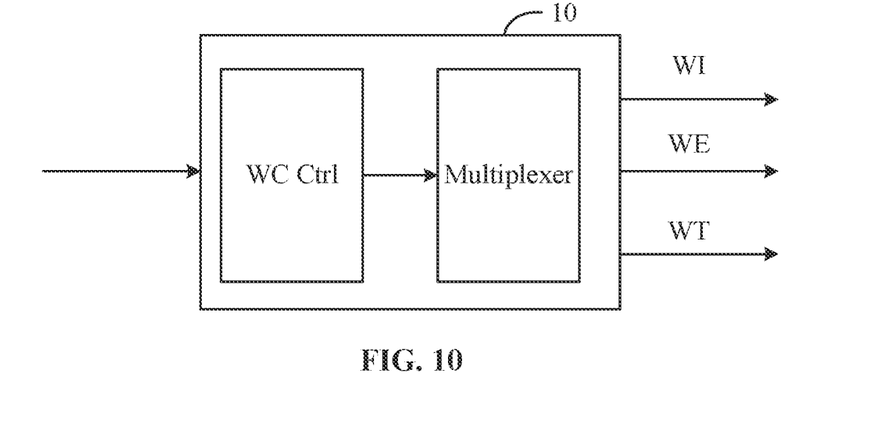
FIG. 10 is a schematic diagram of write channels of a reconfigurable processor according to the second embodiment of the present disclosure.

Considering that the reconfigurable processor 10 also has access to data in the tightly coupled memories (TCM), the access to the read channels and the write channels of the reconfigurable processor 10 may have three sources, as shown in FIG. 9 and FIG. 10. FIG. 9 is a schematic diagram of read channels of a reconfigurable processor according to the second embodiment of the present disclosure. In FIG. 9, the sources of the read channels are RI, RE, and RT, respectively. In FIG. 9, the read channel data is managed by a multiplexer and a read channel (RC) Ctrl in the reconfigurable processor 10, where RC Ctrl represents a read channel controller. FIG. 10 is a schematic diagram of write channels of a reconfigurable processor according to the second embodiment of the present disclosure. In FIG. 10, the sources of the write channels are WI, WE, and WT, respectively. In FIG. 10, the write channel data is managed by a multiplexer and a write channel (WC) Ctrl in the reconfigurable processor 10, where WC Ctrl represents a write channel controller.

Figure 11:
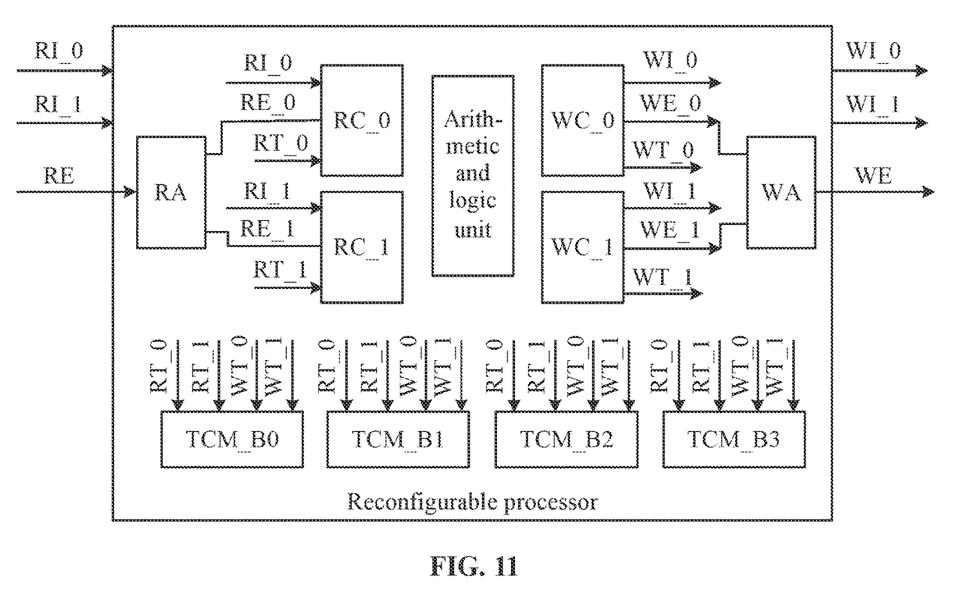
FIG. 11 is a schematic diagram of internal channels connection of a reconfigurable processor according to the second embodiment of the present disclosure.

FIG. 11 is a schematic diagram of internal channels connection of a reconfigurable processor according to the second embodiment of the present disclosure. FIG. 11 shows a schematic diagram of connection of read channels and write channels of the reconfigurable processor 10 completely. FIG. 11 also shows a relationship between external data access ports and internal TCM access ports of the reconfigurable processor 10. In FIG. 11, it is assumed that 4 TCM BLOCKs exists, where RA (Read Arbitrator) represents a read arbitrator, WA (Write Arbitrator) represents a write arbitrator, ports RI_0 and RI_1 for external inputs are directly connected to a port RI_0 of a read channel 0 and a port RI_1 of a read channel 1, and a port RE_0 of the read channel 0 and a port RE_1 of the read channel 1 are connected to the external port RE through the read arbitrator, and a port WI_0 of a write channel 0 and a port WI_1 of a write channel 1 are connected to external output ports WI_0 and WI_1, and the port WI_0 of the write channel 0 and the port WI_1 of the write channel 1 are connected to the external port WE through the write arbitrator.

In the reconfigurable processor system according to the present embodiments, multiple reconfigurable processors can be expended by being cascaded to obtain larger-scale arithmetic capabilities, which can meet the requirements of different application scenarios, and data accessing is performed by the preset read and write channels, which improves the efficiency of data access. A unified hardware architecture and configuration instructions, and a combination of data flow driving and instruction flow driving are used, which can not only obtain good PPA performance, but also maintain sufficient flexibility.

What is claimed is:

1. A reconfigurable processor, comprising: a hardware message management module, a memory management system and an arithmetic and logic unit, wherein the memory management system is connected to the hardware message management module and the arithmetic and logic unit respectively;
   wherein the hardware message management module is configured to read and parse at least one hardware message, configure a priority for each of the at least one hardware message, and store each of the at least one hardware message in a memory through the memory management system; and
   the arithmetic and logic unit is configured to run the at least one hardware message according to the configured priority.

2. The reconfigurable processor according to claim 1, wherein the hardware message management module is configured to read the at least one hardware message through a set channel, wherein each of the at least one hardware message comprises configuration flow information and data space information.

3. The reconfigurable processor according to claim 1, wherein the arithmetic and logic unit is configured to generate a computation mode through reconfiguration, and a number of the computation mode is at least one.

4. The reconfigurable processor according to claim 1, wherein the arithmetic and logic unit comprises at least one basic arithmetic unit of a multiplier, an adder and a comparator.

5. The reconfigurable processor according to claim 1, wherein the memory management system comprises a general direct memory access (GDMA) subunit, a channel arbitrator and a data flow management subunit, and the memory management system is configured to perform data transmission.

6. The reconfigurable processor according to claim 1, further comprising a register file, wherein the register file is connected to the memory management system and the arithmetic and logic unit respectively.

7. The reconfigurable processor according to claim 6, wherein the register file is configured to configure addresses, in a memory, of the hardware messages transmitted by the memory management system, and to provide the arithmetic and logic unit with registers required for arithmetic.

8. The reconfigurable processor according to claim 1, further comprising a power consumption management unit, wherein the power consumption management unit is connected to the hardware message management module, the memory management system and the arithmetic and logic unit respectively and is configured to perform power consumption management.

9. A reconfigurable processor system comprising at least two cascaded reconfigurable processors according to claim 1.

10. The reconfigurable processor system according to claim 9, wherein the at least two reconfigurable processors are configured to perform data access through a preset read channel and a preset write channel.

* * * * *